(12) United States Patent
Azens et al.

(10) Patent No.: US 6,211,995 B1
(45) Date of Patent: Apr. 3, 2001

(54) ELECTROCHROMIC DEVICE COMPRISING TANDEM LAYERS OF CATHODIC/ANODIC MATERIALS

(75) Inventors: Andris Azens, Uppsala (SE); Guntars Vaivars, Riga (LV); Monica Veszelei, Uppsala (SE); Lisen Kullman, Uppsala (SE); Claes-Goran Granqvist, Uppsala (SE)

(73) Assignee: Forkarpatent 1 Uppsala AB, Uppsala (SE)

( * ) Notice: Subject to any disclaimer, the term of this patent is extended or adjusted under 35 U.S.C. 154(b) by 0 days.

(21) Appl. No.: 09/213,440

(22) Filed: Dec. 17, 1998

(30) Foreign Application Priority Data

Sep. 22, 1998 (SE) .................................................. 9803210

(51) Int. Cl.$^7$ ..................................................... G02F 1/153
(52) U.S. Cl. ........................................... 359/273; 359/265
(58) Field of Search .................................. 359/265, 267, 359/273, 274, 275

(56) References Cited

U.S. PATENT DOCUMENTS

| | | | |
|---|---|---|---|
| 5,673,150 | * 9/1997 | Ono et al. | 359/265 |
| 5,793,518 | 8/1998 | Lefrou et al. | 359/275 |
| 5,838,483 | * 11/1998 | Teowee et al. | 359/265 |

* cited by examiner

*Primary Examiner*—Huy Mai
(74) *Attorney, Agent, or Firm*—Young & Thompson

(57) ABSTRACT

An electrochromic device (10) for windows, displays, rear view mirrors, eye wear and other applications includes three layers (2), (4) and (5) of electrochromic materials and an electrolyte, with the transmittance of the layers (2) and (5) being variable by an applied electrical field, and protective layer (4) being transparent and not contributing to the coloration/bleaching of device. The protective layer (4) is made of the same electrochromic material as the electrochromic layer on the opposing side of the electrolyte.

9 Claims, 5 Drawing Sheets

ELECTROCHROMIC DEVICE COMPRISING TANDEM LAYERS OF CATHODIC/ANODIC MATERIALS

TECHNICAL FIELD

The present invention relates to a laminated electrochromic device, a so-called EC device and, in particular, to such a device having a protective layer positioned on one side of the electrolyte layer.

STATE OF THE ART

Electrochromic devices can be used for modulating transmittance, reflectance, scattering, and thermal emittance by means of an applied electrical field. A standard electrochromic device employs a cathodically coloring electrochromic film (such as W oxide) and an anodically coloring (such as Ni oxide) or transparent (such as Ce oxide) counter electrode brought in contact by a solid electrolyte. Examples of such devices are displays and anti-dazzling rear-view mirrors in cars.

One of the most difficult problems with practical electrochromic devices is their limited long-term durability due to chemical incompatibility between the electrolyte layer and the adjoining electrochromic film and counter electrode. Thus $WO_3$—the prime candidate for the electrochromic films—is stable in a moderately acidic environment whereas it is rapidly dissolved in a basic electrolyte. On the other hand, a major contender for being the counter electrode, $NiO_xH_y$, is stable in a basic environment but unstable in an acidic one. This often causes difficulties in production of such devices since the life time is not sufficient.

At present there is no single generally accepted concept of the best way of producing EC devices.

A known possible solution to the stability problem is to invoke an additional protective layer, by means of which damage of the layers can be avoided, thereby increasing the device life time.

It is known from U.S. Pat. No. 4,120,568 to provide a "substantially insulating dielectric layer" between the electrochromic and the electrolyte layer. The materials employed for this purpose are, for instance, SnO, SiO, SiO:Au, TiO and CrN.

It is also known to use non-aggressive electrolytes to obtain sufficient life times without using any protective layers.

There are, however, many chemically aggressive electrolytes of interest for use in EC devices due to their good electrical and optical properties, which electrolytes cannot be used in conventional EC devices.

DISCLOSURE OF THE INVENTION

The object of the present invention is to provide a solution to the chemical incompatibility problem in EC devices by means of a protective layer of well-suited material positioned on one side of the electrolyte layer, thus increasing the life time of devices.

According to the invention, an EC device comprises three layers of electrochromic materials, of which one acts as a protective layer. Device thereby produced use the same material for both the electrochromic or counter electrode layer and the protective layer, wherein the protective layer remains transparent and does not affect the coloration and bleaching of the device. The optical inactivity of the protective layer relies on the fundamental energetics of the multi-layer structure and is not a trivial consequence of having a thin-and hence only weakly coloring-layer.

The device may be operated in a light transmitting as well as a light reflecting mode.

According to a preferred embodiment of a device according to the invention, $WO_3$ and $NiO_xH_y$ are employed as the protective layers in devices with acidic and basic electrolyte, respectively.

DESCRIPTION OF THE DRAWINGS

In order to make the present invention easy to understand and produce, it will be described with reference to the appended drawings, in which.

DETAILED DESCRIPTION OF PREFERRED EMBODIMENTS

Figure 1A:
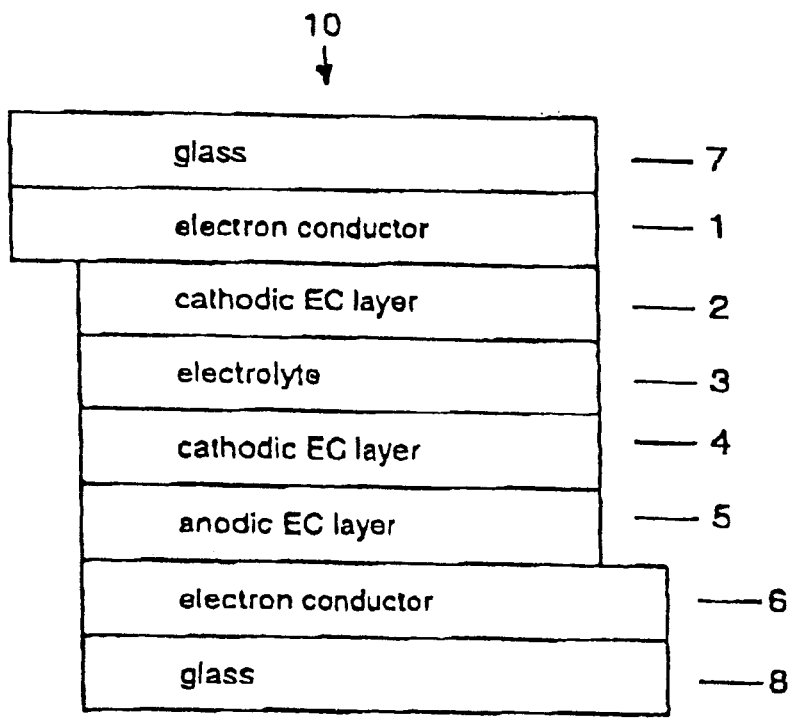
FIG. 1(a) shows an embodiment of an EC device according to the invention, wherein the electrolyte is acidic.

FIG. 1(a) shows a preferred embodiment of an electrochromic device 10 according to the invention. The electrochromic device 10 comprises an electron conducting layer 1, an electrochromic layer 2 of cathodic electrochromic material, a layer 3 of acidic electrolyte, a protective layer 4 of cathodic electrochromic material, a counter electrode layer 5 of anodic electrochromic material, and an electron conducting layer 6.

Typically, layers 2 and 4 are made of the same material, such as $WO_3$, $MoO_3$, $TiO_2$ or their mixtures. Layer 3 is, for example, a zirconium phosphate—based proton conductor, but not limited thereto. Any other suitable proton conductor can be employed. Layer 5 is made of an anodic electrochromic material, such as $NiO_x$, $NiO_xH_y$, $IrO_2$, $CoO_2$, $FeO_2$, $MnO_2$, $Cr_2O_3$, or their mixtures. Layer 1 and 6 are typically ITO ($In_2O_3$:Sn), but not limited thereto.

Layer 1 is deposited on a supporting layer, such as a glass layer, 7. Layer 6 is deposited on a supporting layer, such as a glass layer, 8.

The thickness of the layers 2 and 5 are such that the required optical modulation of the device is obtained, typically the thickness is between 0.1 and 1 micrometer. The thickness of layer 4 is typically above 0.1 micrometer, this layer is always transparent and does not contribute to the optical coloration.

Figure 1B:
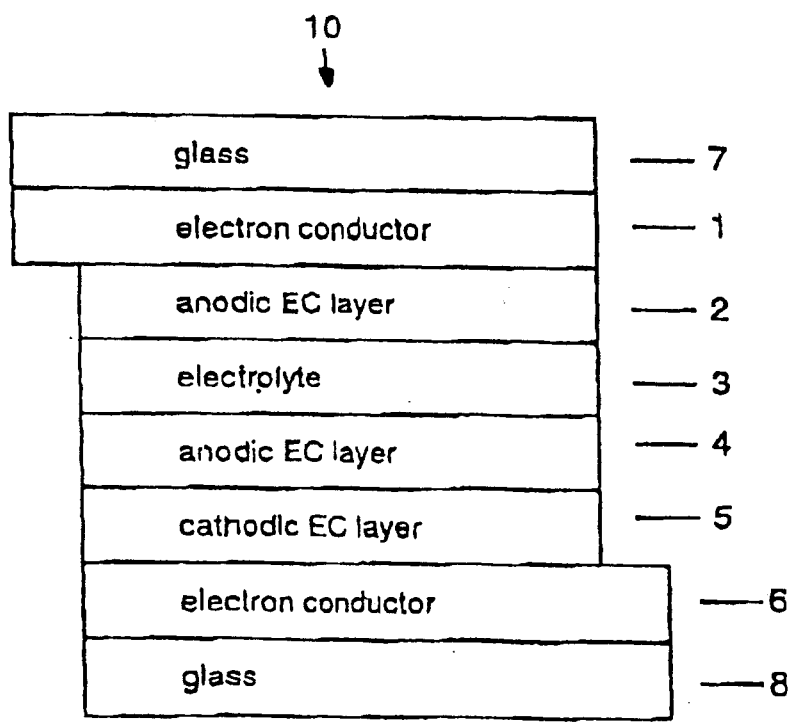
FIG. 1(b) shows an embodiment of an EC device according to the invention, wherein the electrolyte is basic.

FIG. 1(b) shows another preferred embodiment of an electrochromic device according to the invention, comprising basic electrolyte. Layer 1 is an electron conducting layer. Counter electrode layer 2 is made of anodic electrochromic material, such as $NiO_x$, $NiO_xH_y$, $IrO_2$, $CoO_2$, $FeO_2$, $MnO_2$, $Cr_2O_3$, or their mixture. Layer 3 is basic electrolyte. Protective layer 4 is of anodic electrochromic material. Electrochromic layer 5 is of cathodic electrochromic material, such as $WO_3$, $MoO_3$, $TiO_2$ or their mixture. Layer 6 is an electron conductor. Layers 1 and 6 are typically ITO ($In_2O_3$:Sn), but not limited thereto.

The thickness of the layers 2 and 5 are such that the required optical modulation of the device is obtained, typically between 0.1 and 1 micrometer. The thickness of layer 4 is above 0.1 micrometer; this layer is always transparent and does not contribute to the optical coloration.

Optical inactivity of the protective layer in such device can be explained by arguments similar to the ones used below for device with acidic electrolyte.

Figure 2:
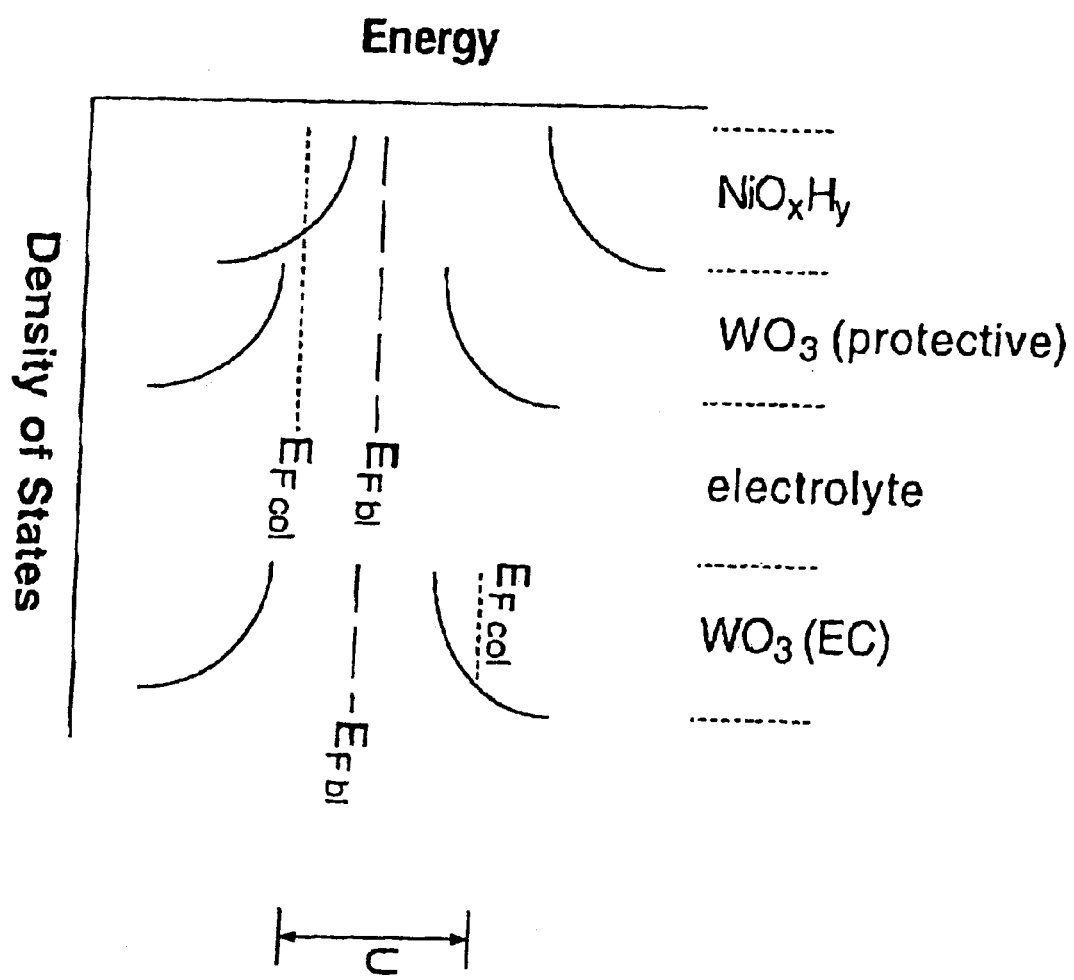
FIG. 2 shows schematic electron density of states of the layers in an electrochromic device shown in FIG. 1(a).

FIG. 2 gives a schematic presentation of electron density of states for the multilayer structure shown in FIG. 1(a), with $WO_3$ used for the electrochromic and protective layers, and $NiO_xH_y$ used for the counter electrode. In the bleached state, the Fermi energy $E_{F\,bl}$ for $NiO_xH_y$ is expected to lie slightly above the valence band edge. For W oxide, $E_{F\,bl}$ lies in the band gap separating a valence band dominated by O2p states from a conduction band dominated by W5d states.

When a coloration voltage U is applied between the $NiO_xH$ and $WO_3$ films, their Fermi levels $E_{F\,col}$ are separated. Electrons enter the W5d states where they cause polaron absorption provided that the W oxide film is heavily disordered. A corresponding charge is subtracted from the top of the valence band of the Ni oxide film hereby rendering this material absorbing by a mechanism that appears to be non-polaronic but is not known in detail. Thus the initially transparent device turns absorbing by a combination of anodic electrochromism in $NiO_xH_y$ and cathodic electrochromism in $WO_3$. The applied coloration potential does not induce any changes in the band structure of the $WO_3$ film on the $NiO_xH_y$ side, which explains the optical inactivity of the protective layer in an EC device according to the invention.

The relative energies of the density of states shown in FIG. 2 can be inferred by additional arguments. Thus if an absorbing device combining $NiO_xH_y$ and $WO_3$ is shorted it turns transparent, implying that—as expected—the bottom of the conduction band of $WO_3$ lies at a higher energy than the top of the valence band of $NiO_xH_y$.

The $WO_3$ films used for protective layers have been characterized in terms of AFM and cyclic voltammetry in 1M Li:PC, in both cases in comparison to typical $WO_3$ films used for EC layers.

Figure 3A:
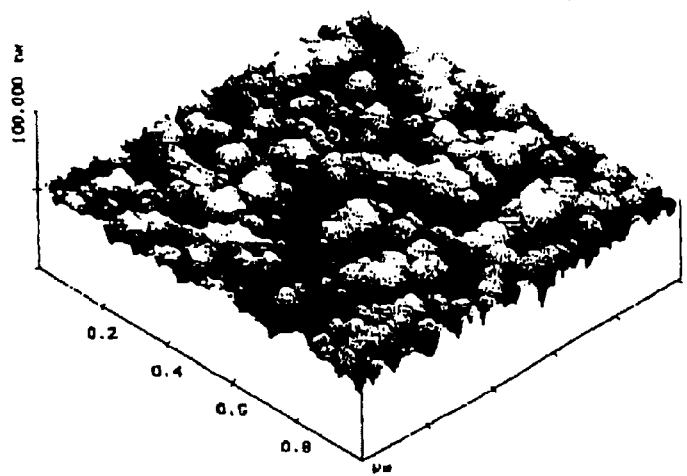
FIGS. 3a–b show AFM images of $WO_3$ films typically used for protective (a) and electrochromic (b) layers. Both films are deposited on ITO.
Figure 3B:
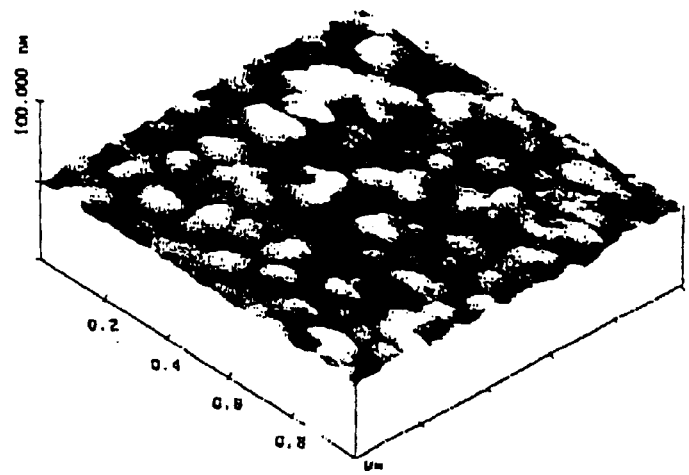

The AFM images in FIGS. 3a and 3b show that the protective layer is more compact than the electrochromic one, the corresponding RMS roughness values are 1.5 and 4, respectively.

Figure 4:
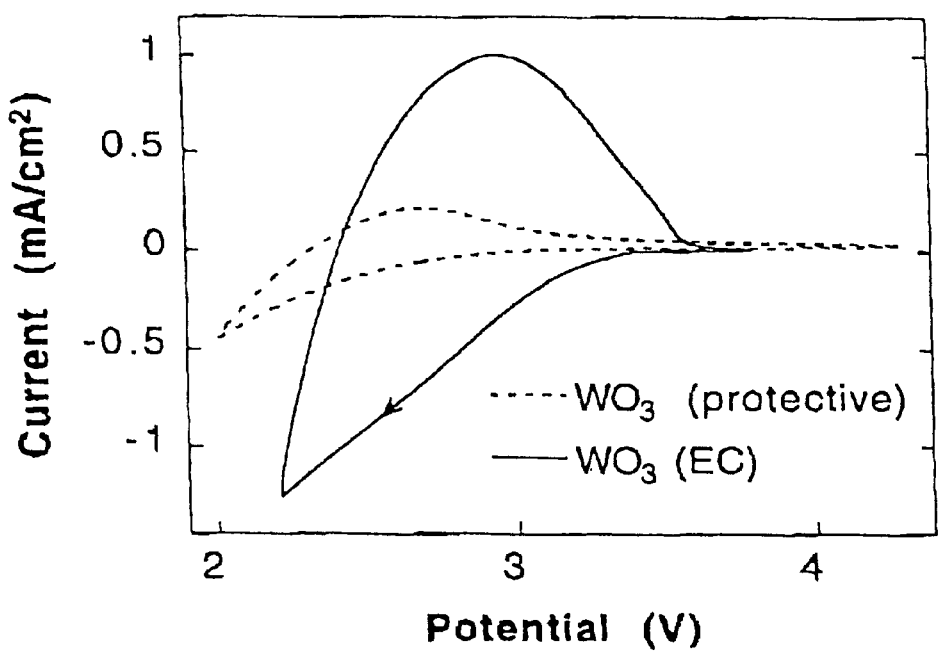
FIG. 4 shows voltammograms of $WO_3$ films typically used for protective (dashed line) and electrochromic (solid line) layers. Both films deposited on ITO. Data taken in a Li:PC electrolyte.

Voltammograms taken in 1M Li:PC for typical $WO_3$ films used for electrochromic and protective layers—both deposited on ITO—are shown in FIG. 4. Considerably lower current at the same potential scan speed can be assigned to slower ion transport through the protective layer film compared to the electrochromic $WO_3$ film, which in turn is due to the higher density of the protective layer film.

Figure 5:
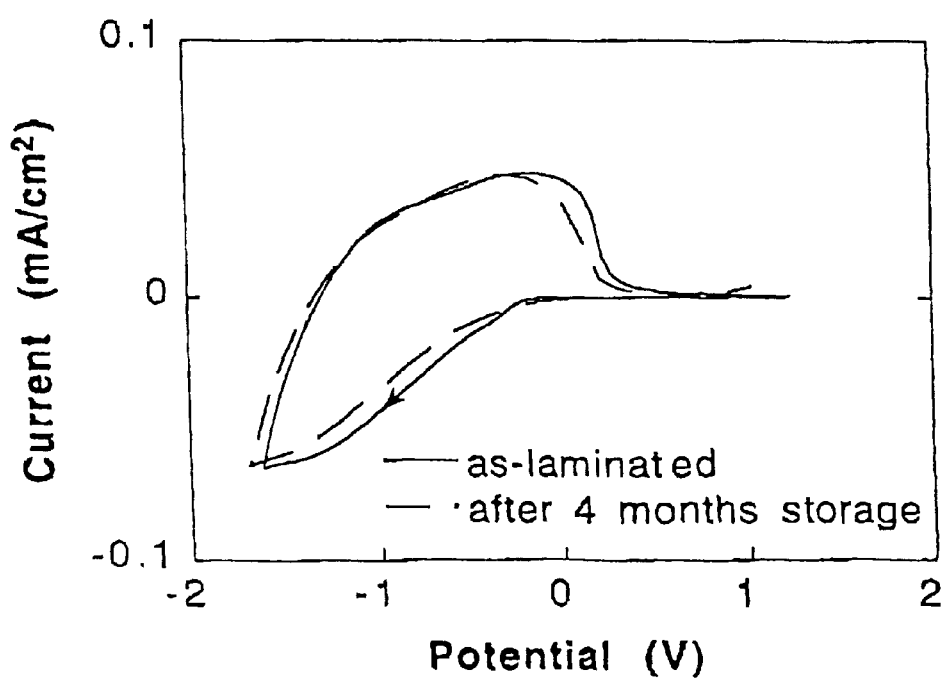
FIG. 5 shows voltammograms for a $WO_3$/zirconium phosphate based electrolyte/$WO_3$/$NiO_{xHy}$ device, recorded after lamination (solid line) and after four months of storage (dashed line).

FIG. 5 shows voltammograms for a $WO_3$/zirconium posphate based electrolyte/$WO_3$/$NiO_xH_y$ device, recorded after lamination and after 4 months of storage. In a similar device without protective layer, the lifetime of the $NiO_xH_y$ film is of the order of a few seconds. There are no features in voltammograms that can be clearly assigned to any effects introduced by the presence of the protective layer.

Figure 6:
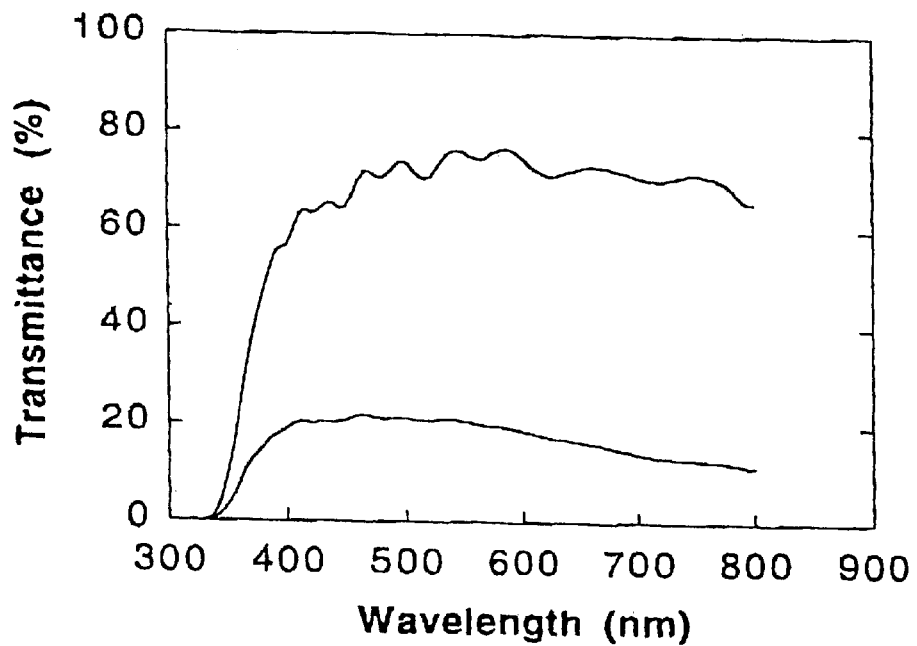
FIG. 6 shows optical transmittance in bleached and colored states for a $WO_3$/zirconium phosphate based electrolyte/$WO_3$/$NiO_xH_y$ device.

FIG. 6 shows optical transmittance in bleached and colored states for a $WO_3$/zirconium posphate based electrolyte/$WO_3$/$NiO_xH_y$ device. Coloration/bleaching was accomplished at 1.9/–1V for three minutes. It can be seen that there is no absorption introduced by the $WO_3$ protective layer in the bleached state of device.

Figure 7:
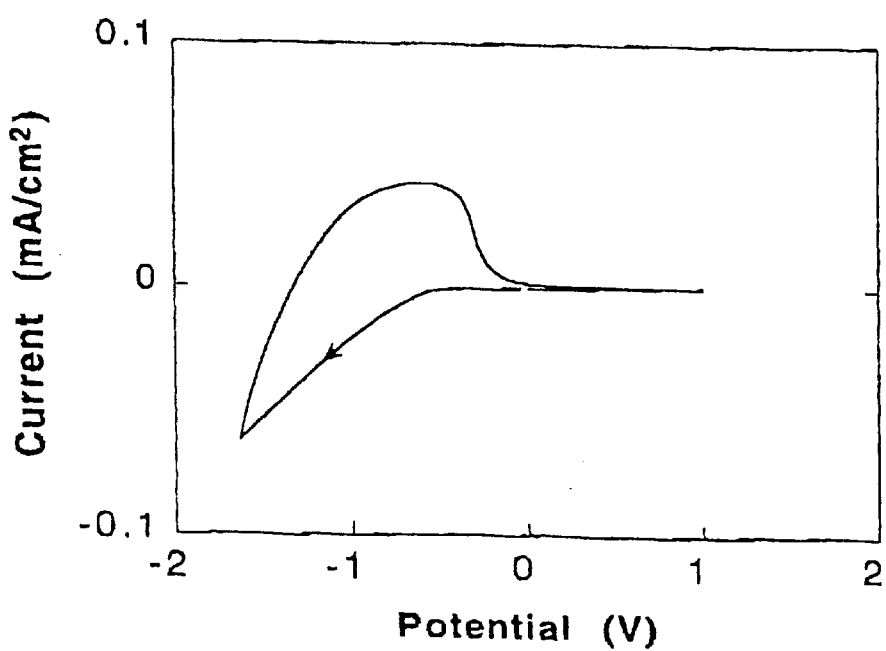
FIG. 7 shows voltammogram for a $WO_3$/$NiO_{xHy}$/aluminum oxide based electrolyte/$NiO_{xHy}$ device.

FIG. 7 shows a voltammogram for a $WO_3$/$NiO_xH_y$/aluminium oxide based electrolyte/$NiO_xH_y$ device. The electrolyte in this device was not transparent, making the transmittance measurements impossible. Visual observations showed, however, that the coloration/bleaching of device on either side was not affected by the $NiO_xH_y$ protective layer. Again, voltammogram of such device does not contain any features introduced by the protective layer.

Deposition techniques for electrochromic and counter electrode films and device lamination are described in A. Azens, L. Kullman, G. Vaivars, H. Nordborg, C. G. Granqvist, Solid State Ionics, in press. The protective layers were deposited by means of DC magnetron sputtering, but are not limited thereto. The sputter-deposited $WO_3$ films used for protective layers were deposited at ~15 times lower sputter-gas pressure than the electrochromic ones to obtain layers with higher density. A good device performance was obtained with 0.3–0.5 micrometer thick protective layer films.

Contact means, such as leads, are connected to the layers 1 and 6.

Suitable electrolytes can be selected from the group of proton conductors, such as zirconium posphate—based composites.

What is claimed is:

1. An electrochromic device comprising:

a first electron conducting layer;

a cathodic electrochromic layer on said first electron conducting layer;

an acidic electrolyte layer on said cathodic electrochromic layer;

a protective layer of the same cathodic electrochromic material as said cathodic electrochromic layer on said acidic electrolyte layer;

an anodic counterelectrode on said protective layer; and a second electron conducting layer on said anodic counterelectrode.

2. The device of claim 1, wherein said cathodic electrochromic layer and said protective layer comprise $WO_3$.

3. The device of claim 1, wherein said cathodic electrochromic layer and said protective layer comprise one of $MoO_3$ and $TiO_2$.

4. The device of claim 1, wherein said acidic electrolyte layer comprises zirconium phosphate.

5. The device of claim 1, wherein said protective layer has a substantially uniform thickness of 100 to 1000 nanometers.

6. An electrochromic device comprising:

a first electron conducting layer;

an anodic electrochromic layer on said first electron conducting layer;

a basic electrolyte layer on said anodic electrochromic layer;

a protective layer of the same anodic electrochromic material as said anodic electrochromic layer on said basic electrolyte layer;

a cathodic counterelectrode on said protective layer; and a second electron conducting layer on said cathodic counterelectrode.

7. The device of claim 6, wherein said anodic electrochromic layer and said protective layer comprise $NiO_xH_y$.

8. The device of claim 6, wherein said anodic electrochromic layer and said protective layer comprise at least one of the group of compounds consisting of $NiO_x$, $IrO_2$, $CoO_2$, $FeO_2$, $MnO_2$, $Cr_2O_3$.

9. The device of claim 6, wherein said protective layer has a substantially uniform thickness of 100 to 1000 nanometers.

* * * * *